Sept. 16, 1947. J. HANKE 2,427,600
FISHING POLE HOLDER
Filed Feb. 2, 1945 3 Sheets-Sheet 1

Inventor
Joseph Hanke.

By Clarence A. O'Brien
and Harvey B. Jacobson
Attorneys

Sept. 16, 1947.  J. HANKE  2,427,600
FISHING POLE HOLDER
Filed Feb. 2, 1945  3 Sheets-Sheet 2
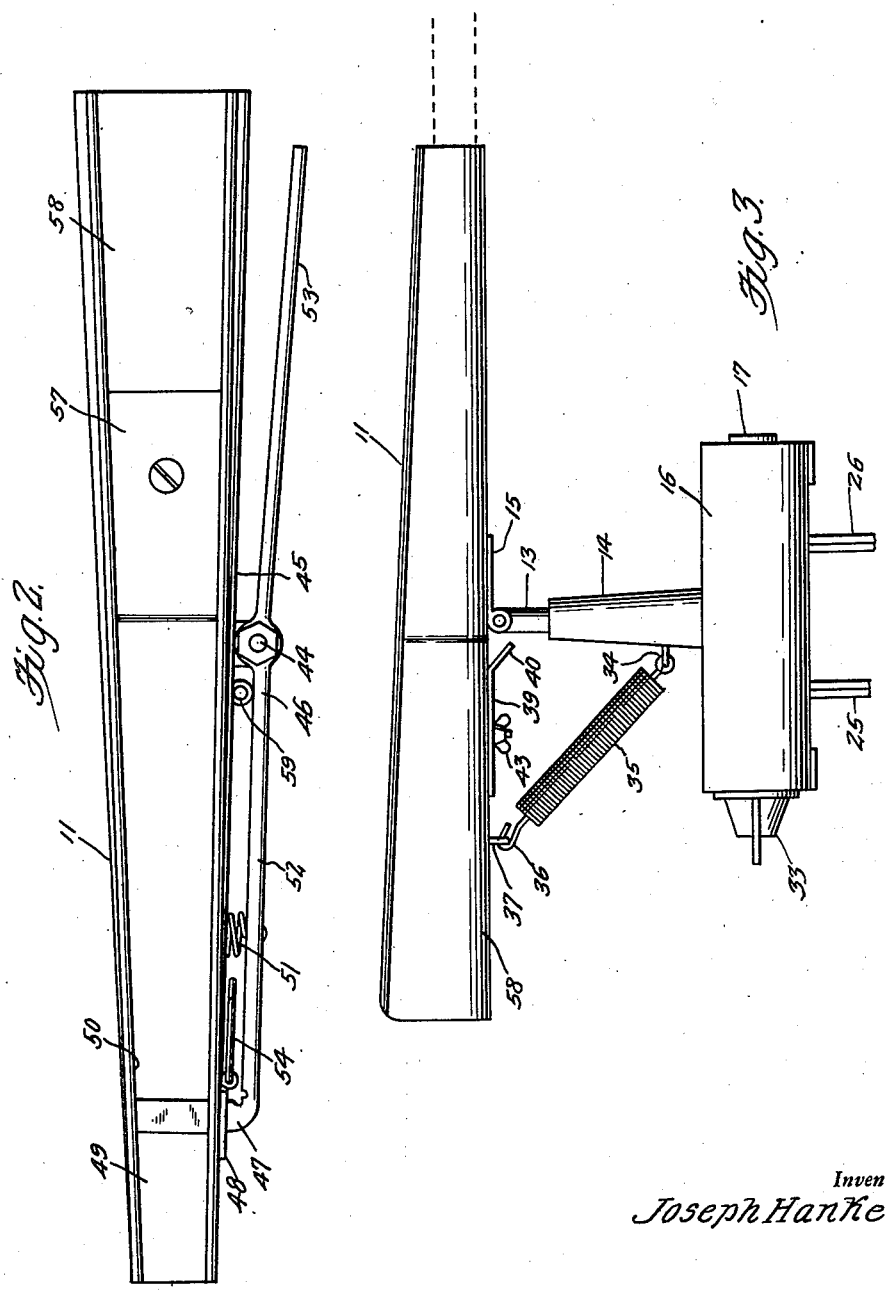
Inventor
Joseph Hanke.
By Clarence A. O'Brien
and Harvey B. Jacobson
Attorneys Sept. 16, 1947.  J. HANKE  2,427,600
FISHING POLE HOLDER
Filed Feb. 2, 1945  3 Sheets-Sheet 3
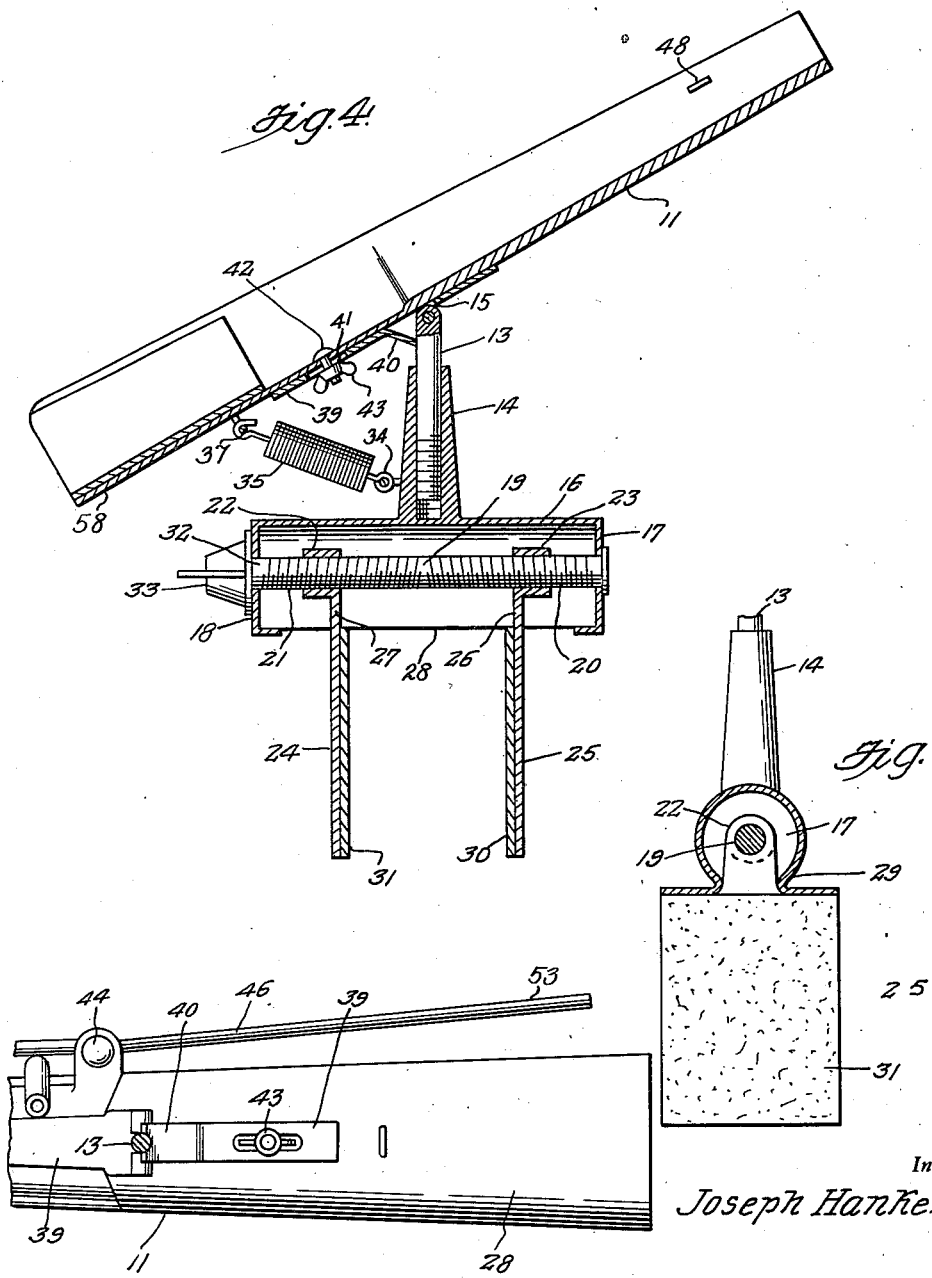
Inventor
Joseph Hanke.

Patented Sept. 16, 1947

2,427,600

UNITED STATES PATENT OFFICE 2,427,600

FISHING POLE HOLDER

Joseph Hanke, Chicago, Ill.

Application February 2, 1945, Serial No. 575,797

6 Claims. (Cl. 248—42)

This invention relates to improvements in fishing pole holders and has for an object to provide a spring controlled pivotally mounted device of this kind.

Another object of the invention is to provide a pole holder with an angle adjusting means.

A further object of the invention is to provide a fishing pole holder having vertical adjustment.

A still further object of the invention is to provide a pole support having an attaching clamp comprising a pair of jaws arranged to move simultaneously toward or away from one another.

Other features and advantages will become more readily apparent from the following description and the accompanying illustrative drawings in which:

Figure 2 is a plan view of the device,

Figure 3 is another elevational view of the holder,

Figure 4 is a sectional elevation of the invention,

Figure 6 is a bottom plan view broken away and illustrating an adjustment member, Figure 7 is a sectional view taken on line 7—7 of Figure 1.

Figure 1:
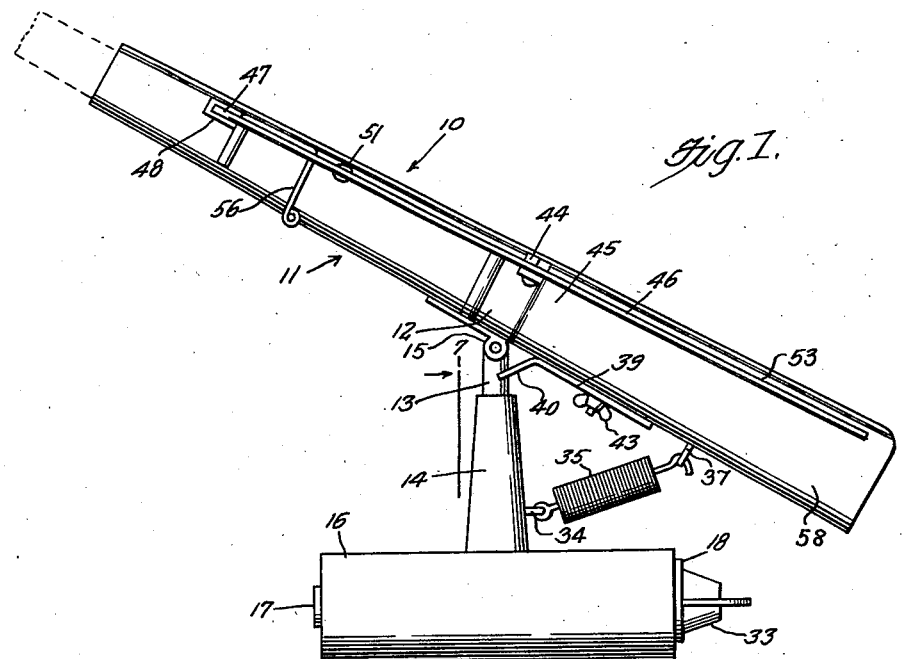
Figure 1 is an elevational view of my pole support shown attached to a support.
Figure 8:
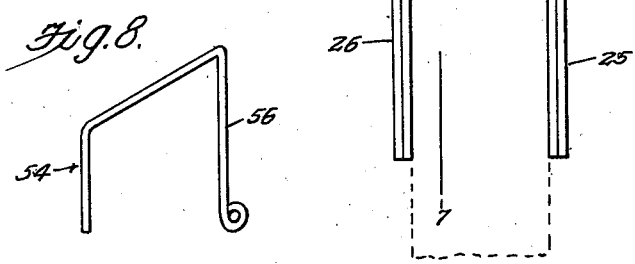
Figure 8 is a detail perspective view of a lock control.
Figure 5:
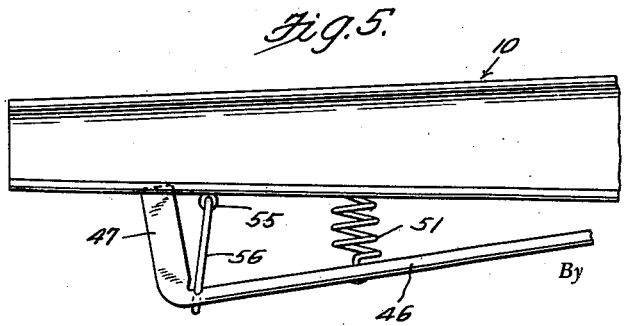
Figure 5 is a detail view illustrating a locking member.

In the specifications to follow as well as in the accompanying drawings like reference characters designate like parts and 10, indicates a fishing pole holder which consists of a semi-tubular tapering pole support 11, the center under portion 12, of which is secured to a screw 13, threaded into an internally threaded upright barrel 14. The pin 13, being secured to the member 11, by a hinge 15. The member 14, is fixedly mounted upon a horizontal cylinder 16, the end walls 17 and 18, of which form bearings for a right and left hand screw 19. Threaded upon each end 20 and 21, of the right and left handed screw are the bearings 22 and 23, of a pair of depending leaf jaws 24 and 25, the necks 26 and 27, of which project through an elongated slot 28, in the under wall portion 29, of the member 16. These jaws are flat and of greater width than the cylinder 16, and are lined on their inner faces with flexible soft cushions 30 and 31, in order not to mar any article to which they may be attached and also to provide a firmer grip on such article. To the extending end 32, of the screw 19, is fixed a wing nut or cap 33, whereby the screw may be operated to move the jaws toward or away from one another.

Provided adjacent the lower end of member 14, is an eye 34, to which is secured one end of a coil spring 35, the other end of which is provided with a hook 36, for engagement with an eye 37, adjacent the end 58, of the pole holder 11, whereby said member will be held in normal position, although it may be swung up or down or in either horizontal direction, but will return to normal as soon as tension is relieved.

In order to adjust the vertical angle of the member 11, I provide upon its under side a slide 39, having a turned down angular end 40, which may be engaged with the member 13, in order to hold said member 11, in adjusted angular position (see Figures 1 and 4), this being accomplished by a longitudinal slot 41, in said member 39, through which projects a screw 42, and which has threaded on its outer end a wing nut 43.

Pivoted on a fulcrum 44, on the side 45, of member 11, and near its center, is a lever 46, the end 47, of which is flattened and projected through a slot 48, the member 47, of a length to entirely cross the small end 49, of the member 11, and bear against the surface 50, thereof in order to secure the fishing pole seated in the said member 11. In order to hold said member 47, in operative position, a contraction spring 51, is secured to the end 52, of the lever and to the side wall 45. When the end 53, of the lever is pressed against said wall 45, the lock member 47, will be withdrawn from across said end 49, and may be held in its out, or inoperative, position by means of an inverted U-member 54, pivoted to wall 45, as at 55, its vertical arm 56, being adapted to swing out against the end of the member 46, and hold the same against the action of spring 51. Rubber or other padding 57, is provided in the handle receiving end 58, of the member 11, in order to avoid marring the same. There is provided an eye 59, to which a bell (not shown) is to be connected so that when a fish strikes an alarm will be given to notify the lazy, otherwise occupied Waltonian. The give in any direction provided for by the spring 35, will prevent breaking of the pole, or line, no matter how game the caught fish may be, or how determined it is to free itself.

It is thought that persons skilled in the art to which the invention relates will be able to obtain a clear understanding of the invention after considering the description in connection with the drawings. Therefore, a more lengthy description is regarded as unnecessary.

Minor changes in shape, size and rearrangement of details and parts such as come within the purview of the invention claimed may be resorted to, in actual practice, if desired.

Having now described my invention, that which I claim as new and desire to procure by Letters Patent is:

1. A fish pole support comprising a semi-cylindrical pole holder, an upright rotatable member to which the holder is hinged, an internally threaded member into which the first member is threaded, a spring connecting said member and holder, a spring controlled lock for a pole, means for holding the lock from operative position, a lever actuating the lock, means for adjusting the angle of said holder, and a clamp member including a pair of simultaneously movable jaws upon which said externally screw threaded member is carried.

2. A fish pole support comprising a semi-cylindrical pole holder, an upright rotatable member to which the holder is hinged, an internally threaded member into which the first member is threaded, a spring connecting said member and holder, a spring controlled lock for a pole adapted to extend transversely through said pole holder, means for holding the lock from operative position, a lever actuating the lock, and means for adjusting the angle of said holder.

3. A fish pole support comprising a semi-cylindrical pole holder, an upright rotatable member to which the holder is hinged, and an internally threaded member into which the first member is threaded for vertical adjustment thereof.

4. A fishing pole holder comprising an elongated semi-cylindrical holder member, means for vertical adjustment thereof relative to a support, said means providing pivotal action of said member, means for locking a portion of a pole forward of its butt end to the holder, means for clamping the holder to a support, and means whereby the line end of a pole is held normally raised but free to be lowered upon pulling thereon.

5. A fishing pole holder comprising an elongated semi-cylindrical holder member, means for vertical adjustment thereof relative to a support, said means providing pivotal action of said member, means extending through the pole holder for locking a portion of a pole forward of its butt end to the holder, and means for clamping the holder to a support.

6. A fishing pole holder comprising an elongated semi-cylindrical holder member, means for vertical adjustment thereof relative to a support, said means providing pivotal action of said member, and means extending through the pole holder for locking a portion of a pole forward of its butt end to the holder.

JOSEPH HANKE.

REFERENCES CITED

The following references are of record in the file of this patent:

UNITED STATES PATENTS

| Number | Name | Date |
| --- | --- | --- |
| 2,199,034 | Witczak | Apr. 30, 1940 |
| 2,089,452 | Utley | Aug. 10, 1937 |
| 2,184,583 | Danko | Dec. 26, 1939 |
| 2,311,823 | Gaskill | Feb. 23, 1943 |